United States Patent Office 3,461,081
Patented Aug. 12, 1969

3,461,081
STABILIZING AGENT FOR A HALOGEN CONTAINING SYNTHETIC RESIN CONSISTING OF A BASIC INORGANIC ACID SALT OF LEAD COATED WITH A FATTY ACID SOAP OF LEAD, CADMIUM OR CALCIUM
Yujiro Sugahara, Taketoshi Yamada, Yoshibumi Noshi, and Shyoji Matsuo, Tsuruoka-shi, Japan, assignors to Mizusawa Kagaku Kogyo Kabushiki Kaisha, Osaka, Japan, a corporation of Japan
No Drawing. Filed June 18, 1965, Ser. No. 465,190
Claims priority, application Japan, July 17, 1964, 39/40,137
Int. Cl. B01j 1/16; C08f 45/56; C08g 51/56
U.S. Cl. 252—400                        11 Claims

ABSTRACT OF THE DISCLOSURE

A process for the preparation of a stabilizer for halogen-containing synthetic resin and a stabilizer so produced which process comprises adding a finely divided metallic salt stabilizing agent to a molten metallic soap, mixing them to form a mixture wherein all the particles of the stabilizing agent are coated with continuous phase of metallic soap and converting the mixture to particulate form.

The present invention relates to a process for the preparation of a stabilizer to be blended with synthetic resins. More particularly the invention relates to a process for the preparation of a stabilizer in which the scattering of such finely divided stabilizing agent having a melting point higher than the softening point of the synthetic resin is prevented, and which can be uniformly dispersed in the synthetic resin during the processing of the said resin.

In processing of synthetic resins, particularly halogen-containing synthetic resins, such as molding thereof, conventionally large quantities of powdered metallic blending agents having high melting points have been added to the resin as the stabilizer. The amount of use of such blending agents is considerably greater than that of organic blending agent having low melting point. These powdered blending agents do not melt during the shaping operations of synthetic resins because of their high melting points, and therefore it is necessary, in order to improve their dispersibility in the resin under processing, to add such blending agents in very finely divided state, e.g., of such a particle size as will freely pass through a sieve of 200 mesh, in which case most of the particles have diameters less than 50μ. For this reason, the fine particles tend to scatter about at the time of adding such blending agents to synthetic resins, which causes operational difficulty in measuring and also is unsanitary. Particularly, such conventional stabilizing agents as lead-containing blending agents ad metallic soaps are generally highly toxic, and their penetration into the operators' bodies as their fine particles scatter about is dangerous. On the other hand, extremely complicated operational steps and expensive equipment are required in order to practice the blending under such conditions as will prevent the scattering of the powdered blending agents for the sake of the operators' safety. This makes the attempt impracticable.

The main object of the present invention is to eliminate the above difficulty in blending lubricants and/or stabilizing agents with halogen-containing, particularly chlorine-containing, synthetic resins to provide a stabilizer to be blended with synthetic resins which does not scatter about so that its blending operation is safe and simple; to produce a stabilizer which is uniformly dispersible in the synthetic resin; and to provide a process for the preparation of the stabilizer.

Another object of the invention is to provide a process for making the stabilizer into uniform granules convenient for use.

Other objects and advantages of the invention will become apparent from reading the following specification.

The above objects and advantages are achieved, in accordance with the present invention, by the process for the preparation of a stabilizer to be blended with synthetic resins which comprises adding a finely divided synthetic-resin-stabilizing agent which consists of a metal-containing compound having a melting point higher than the softening point of the synthetic resin, to a molten metallic soap, which is a lubricant as well as a stabilizing agent of the synthetic resin and has a melting point not higher than the softening point of the synthetic resin, mixing them uniformly and thereafter converting the same into a desired form.

The metallic soap used in the invention is any which has been used as a lubricant as well as a stabilizer of synthetic resins and which has a melting point not higher than the softening point of the synthetic resin. It is selected depending on the type of the synthetic resin to which the stabilizer is to be added.

For example, when the synthetic resin is of a chlorine-containing type, e.g. vinyl chloride resin and vinyl chloride-vinylidene chloride copolymer, such metallic soap as a fatty acid lead soap, such as lead stearate, fatty acid cadmium soap, such as cadmium stearate, and fatty acid calcium soap, such as calcium stearate, may be used.

The finely divided solid powder of a stabilizing agent to be added to the molten metallic soap consists of a metal-containing compound having a melting point higher than the softening point of the synthetic resin with which the stabilizer of the present invention is to be blended.

As such metal-containing compounds, for example, inorganic acid salts of alkaline earth metals and heavy metals such as of cadmium, barium, calcium, magnesium and lead, such as the sulfates, carbonates, phosphates, phosphites and titanates thereof; oxides of the foregoing metals; and organic acid salts such as stearates, laurates and phthalates of some of the foregoing metals are used. As more specific examples, tribasic lead sulfate, dibasic lead phosphite, dibasic lead phthalate, calcium stearate and barium stearate are frequently used.

Some of the above metallic soaps and stabilizing agents have melting points considerably close to the softening point of the halogen-containing synthetic resins with which the stabilizer of this invention is to be blended, and therefore, depending on the type of the synthetic resin in certain cases, they may be melted or fail to be melted at a temperature below the melting point of the synthetic resin employed. However, in all cases, the softening point of each specific case can be determined in accordance with the type of the synthetic resin used. Therefore, in the present specification, the substance which has a melting point the same or lower than the softening point of the synthetic resin with which the stabilizer of the invention is to be blended is referred to as "metallic soap," and the substance which does not melt at the softening point of the resin or therebelow is referred to as "stabilizing agent" or "metal-containing compound."

In accordance with the present invention, the powdered stabilizing agent is thrown into the molten metallic soap, and the resultant mixture is agitated to form a uniform dispersion of the former in the latter. At that time the molten metallic soap may react with the powdered stabilizing agent to a certain degree, but the reaction will not impair the stabilizing effect or lubricating effect of the blended composition.

At the optional stage of the preparation of the above dispersion, for example, during the melting operation of the metallic soap or at the time of adding the powdered stabilizing agent to the molten metallic soap, it is possible to further add to the dispersion an additive for lowering the melt viscosity of the metallic soap. As such melt viscosity-lowering agent, for example, fats, fatty acids, esters of fatty acids, fatty acid amides, higher alcohols and paraffins may be named. Furthermore, it is also possible to suitably add coloring agents, e.g. inorganic pigments such as titanium white and carbon black, and other organic pigments, at the time of adding the powdered stabilizing agent having a melting point higher than the softening point of the synthetic resin to the metallic soap.

In adding the finely divided, solid stabilizing agent to the molten metallic soap, the ratio of addition of the finely divided solid to the metallic soap must be such that all of the particles of the stabilizing agent are at least coated with the continuous phase of the metallic soap. This ratio of addition of the finely divided stabilizing agent considerably varies depending on the density of the finely divided stabilizing agent. Generally, however, it is preferred that the ratio be no more than 10 parts by weight per one part of the metallic soap. In the vicinity of the lower limit of the above range of addition ratio, the use of a melt viscosity-lowering agent for the molten metallic soap is usually recommended. Therefore, it is particularly preferred that the addition ratio of the finely divided stabilizing agent to the metallic soap be made no more than 3:1, in which case the use of the viscosity-lowering agent is not necessarily required.

When the amount of the finely divided stabilizing agent added to the metallic soap is considerably large, the dispersion consists of the finely divided stabilizing agent coated with the metallic soap, or of the agglomerates of such particles. Again, when the amount of addition of the finely divided stabilizing agent is small, for example less than 3:1, the dispersion takes the form in which the finely divided stabilizing agent is uniformly dispersed in the continuous phase of the metallic soap.

The prepared homogeneous dispersion is imparted with a desired form. For instance, the dispersion may be cooled and solidified and thereafter roughly crushed into small blocks or coarse grains, or the homogeneous melt dispersion may be granulated or shaped into, for example, solid granules or pellets.

In a preferred method of shaping the granules, the said melt dispersion may be jetted into a gaseous current, particularly into a high temperature gaseous current such as that having a temperature of 500° C. In another preferred method, the said melt dispersion may be granulated as it is poured dropwise onto a heated rotating disc onto which a hot gaseous current of, for example 500° C., is blown so as to cover the said rotating disc therewith. The latter method is particularly advantageous because it is thereby possible to prepare granules of desired and uniform particle size. When the said melt contains a particularly large quantity of the finely divided stabilizing agent having a melting point higher than the softening point of the synthetic resin and accordingly a low fluidity, the fluidity of the melt may be increased by the addition of a viscosity-lowering agent to assist the easy granulation.

The prepared solid composition to be blended with the synthetic resin in accordance with this invention is used as a lubricant as well as a stabilizer of the synthetic resin, particularly thermoplastic resins containing halogens, such as chlorine. This solid composition is characterized in that, the fine particles of the stabilizing agent composed of a metal-containing compound having a melting point higher than the softening point of the synthetic resin are coated with the continuous phase of a metallic soap having a melting point not higher than the softening point of the synthetic resin, which has been used as a lubricant as well as a stabilizing agent of the synthetic resin. When the stabilizer in accordance with this invention is added to the synthetic resin under processing, the metallic soap forming the continuous phase therein readily melts and is uniformly mixed with the resin under the processing conditions at the temperature of at lowest the softening point of the resin. At that time the finely divided stabilizing agent which is contained in the continuous phase and is not melted is also very uniformly dispersed in the synthetic resin. Furthermore, the generally toxic stabilizing agent composed of the said metal-containing compound has a strong tendency to scatter about when it is in the form of fine powder; but in the stabilizer of the present invention the finely divided stabilizing agent is coated with the metallic soap as uniformly dispersed in the latter and is formed into grains or small blocks of the size greater than that of the particles of the stabilizing agent itself and therefore its tendency to scatter about is remarkably inhibited. In addition, the dispersibility of the stabilizer in the resin during the processing of the synthetic resin is also excellent. Again this product is abolutely free from the deficiency that its composition becomes non-uniform during its transfer or handling due to the difference in specific gravities of its constituents. It is quite different than mere mixtures of metallic soap and a powdered metal-containing compound.

Also, according to the present invention, it is possible to include in the stabilizer for the synthetic resin all other substances to be blended with the resin, e.g., coloring agents. In such a case, a single time addition of the stabilizer of this invention, i.e. the stabilizing composition, during the processing of the resin is sufficient for the purpose and therefore the blending operation is much simplified.

It is preferred in this invention that the stabilizer for the synthetic resin should be granulated to the particle size of about the same order as that of the synthetic resin to which the stabilizer is to be added. By so doing the mixing thereof with the synthetic resin can be even more simplified. Generally when the particle size of the stabilizer for synthetic resin is made 60μ or above, formation of dust is nil, and its blending operation is easier as its fluidity from hopper is excellent in such incidental operations as measuring.

In the following the present invention is explained in further detail with reference to working examples, which are intended to be merely illustrative of the invention and not in limitation thereof in any sense.

Example 1

A stabilizer to be blended with vinyl chloride resin was prepared as follows.

One kilogram of stearic acid was heated to 130° C. and melted. Into the melt then 0.4 kg. of litharge (PbO) were gradually added with agitation to cause the complete reaction of the two to form lead stearate. Thereafter to the molten lead stearate 2.5 kg. of finely divided tribasic lead sulfate were added, and the two were continuously agitated until they were uniformly mixed and formed a homegeneous melt in apperance. The melt was then shaped and solidified into pellets or small blocks and thus the desired product was obtained.

Five parts of the thus prepared stabilizer was blended with 100 parts of polyvinyl chloride resin having an average degree of polymerization of about 1100 and 50 parts of dioctyl phthalate. The scattering tendency of the stabilizer during the blending operation was remarkably inhibited, and the dispersibility thereof in the resin product when the blend was kneaded for 5 minutes at 160° C. and formed into a sheet was excellent.

Example 2

A stabilizer to be blended with vinyl chloride resin was prepared in the similar manner as in Example 1, except that 2.5 kg. of the finely divided tribasic lead sulfate used in the said example were replaced by 2.5 kg. of finely divided dibasic lead phosphite. When the so obtained stabilizer was blended with vinyl chloride resin in the similar maner as in Example 1, its scattering tendency was remarkably inhibited, and its dispersibility was also excellent.

Example 3

Example 1 was repeated except that 2.5 kg. of the finely divided tribasic lead sulfate used therein were replaced by 2.5 kg. of finely divided white lead, with similar results.

Example 4

One kilogram of stearic acid was completely reacted with 80 g. of calcium hydroxide under heating to form calcium stearate. Thereafter 2 kg. of finely divided dibasic lead stearate were thrown into the molten calcium stearate, the subsequent operations being similar to those as practiced in Example 1. Thus, the object stabilizer for commercial chlorine-containing resins was obtained.

Example 5

To 0.5 kg. of cadmium stearate molten under heating, 1 kg. of finely divided white lead was added, the subsequent operations being similar to those as practiced in Example 1. Thus, a stabilizer for vinyl chloride resin was obtained.

Example 6

A stabilizer was prepared as in Example 1, the sole variation being that 1 kg. of finely divided barium stearate was thrown into 1 kg. of lead stearate molten under heating.

Example 7

A stabilizer was prepared as in Example 1, the sole variation being that 0.5 kg. of dibasic lead phthalate and 2 kg. of tribasic lead sulfate were thrown into 1 kg. of lead stearate molten under heating.

Those stabilizers obtained in Examples 4 through 7 all showed excellent dispersibility in chlorine-containing thermoplastic synthetic resins similar to the stabilizer obtained in Example 1. They also showed little scattering tendency at the time of blending with the resins.

Example 8

To 1 kg. of stearic acid molten by heating at 130 C., 0.4 kg. of litharge were gradually added with agitation to cause the complete reaction of the two. Thereafter to the resultant molten lead stearate 2 kg. of tribasic lead sulfate powder and 0.5 kg. of cadmium stearate were added and mixed until the mixture took an appearance of a homogeneous melt. The melt was then jetted into a jetting hot air current of 500° C. at the right angle, and was formed into granular solids having diameters ranging from about 3 mm. to about 50µ.

Five parts of the thus obtained stabilizer for vinyl chloride resin was blended with 100 parts of a commercial vinyl chloride-vinylidene chloride copolymer resin and 50 parts of dioctyl phthalate, and the blend was heated for 5 minutes at 160° C. and formed into a sheet. The dispersibility of the stabilizer in the blend was excellent.

Example 9

From below a rotating disc having a diameter of 40 cm., a hot air current of 400° C. was upward, and the said disc under heating was rotated at the rate of 2000–3000 r.p.m. While further blowing a hot air current of 500° C. onto said rotating disc, a melt dispersion formed by adding 80 kg. of dibasic lead stearate, 30 kg. of calcium stearate and 100 kg. of tribasic lead sulfate to 100 kg. of molten lead stearate with agitation was poured dropwise onto the said disc. The pouring operation was completed within about 40 minutes, and the object granular product having a diameter distribution ranging from 177–62µ was obtained.

Example 10

A melt prepared for 50 kg. of calcium stearate and 150 kg. of neutral lead stearate was heated to 130° C. To the same 200 kg. of tribasic lead sulfate, 3 kg. of titanium white and 30 g. of carbon black were added with agitation to form a melt dispersion. Then immediately preceding the granulation thereof, 25 kg. of hardened beef tallow weer added thereto and mixed with agitation to lower the viscosity of the melt dispersion which was thereafter poured onto the rotating disc as described in Example 9 under the same conditions over the period of about 40 minutes, and was formed into agranular product having a diameter distribution similar to that of the product of Example 9.

Six parts of the pellet-formed stabilizer obtained by the above granulation process were mixed with 100 parts of a commercial polyvinyl chloride resin, and the mixture was extruded through an extruding machine at 180° C. to form a hard vinyl chloride resin pipe. The dispersibility of the stabilizer and the pigments was excellent and no scattering of the stabilizer at the time of the blending operation was observed.

Example 11

Two hundred and twenty (220) kg. of lead stearate, 80 kg. of stearic acid and 20 kg. of hardened castor oil were heated and melted in a stainless steel melting vessel at 130–140° C. While maintaining the said temperature in the vessel, 800 g. of carbon powder, 10 kg. of rutile-type titanium white powder, 100 kg. of calcium stearate powder, 50 kg. of barium stearate powder and 350 kg. of tribasic lead sulfate powder were gradually and successively added to the melt with sufficient agitation, and were thoroughly dispersed in the latter.

This melt dispersion was poured onto a disc rotating at 2,190 r.p.m. at the rate of 3–6 kg. per minute, while the disc and its vicinity were maintained at elevated temperatures as heat was provided from below the disc and a hot air current of 380–430° C. was blown onto the upper surface of the disc. The fine pellet-formed melt shaken off the said disc was solidified into fine spherical composition as it passed through the zone of the hot air current and entered into cooling zone, which was collected and screened with sieves of 177µ and 62µ meshes, so that the product should have the particle size about the same to that of commercial vinyl chloride resin.

We claim:

1. A process for the preparation of a stabilizing agent for a halogen-containing synthetic resin which comprises heating a fatty acid soap of lead, cadmium or calcium which has a melting point not higher than the softening point of the halogen-containing resin and is a lubricant for said halogen-containing resin, at a temperature sufficient to melt said fatty acid soap; adding a finely divided metallic salt which is a stabilizing agent for said halogen-containing synthetic resin, to the molten fatty acid soap in an amount of up to 3 parts by weight per part of the fatty acid soap, said metallic salt being selected from the group consisting of basic inorganic acid salts of lead which have a melting point higher than the softening point of the synthetic resin; mixing said metallic salt and said fatty acid soap uniformly to form a mixture wherein substantially all the particles of the finely divided metallic salt are coated with a continuous phase of the fatty acid soap; and thereafter shaping the mixture to a wholly particulate form.

2. The process according to claim 1 wherein a melt viscosity lowering agent selected from fats and fatty acids is further added to the mixture.

3. The process according to claim 1 wherein the mixture is granulated to the particles size of about the same order of the resin with which it is to be blended.

4. The process according to claim 1 wherein the metallic salt is tribasic lead sulfate.

5. The process according to claim 1 wherein the metallic salt is white lead.

6. The process according to claim 1 wherein the fatty acid soap is a stearic acid soap of lead, cadmium or calcium.

7. The process according to claim 1 wherein said shaping is achieved by pouring the mixture dropwise onto a heated, rotating disc onto which a hot gaseous current is blown.

8. A solid composition of a wholly particulate form useful as a stabilizing agent for a halogen-containing synthetic resin, which composition consists essentially of a continuous phase of a fatty acid soap of lead, cadmium or calcium and, uniformly dispersed therein, a finely divided metallic salt as a stabilizing agent for the halogen-containing synthetic resin, said metallic salt being selected from the group consisting of basic inorganic acid salts of lead which have a melting point higher than the softening point of the synthetic resin, said fatty acid soap having a melting point not higher than the softening point of said halogen-containing synthetic resin and being a lubricant for said halogen-containing synthetic resin, and said finely divided metallic salt being present in an amount of up to 3 parts by weight per part of said fatty acid soap.

9. The composition according to claim 8 wherein the metallic salt is tribasic lead sulfate.

10. The composition according to claim 8 wherein the metallic salt is white lead.

11. The composition according to claim 8 wherein the fatty acid soap in a stearic acid soap of lead, cadmium or calcium.

References Cited

UNITED STATES PATENTS

| | | | |
|---|---|---|---|
| 3,002,943 | 10/1961 | Kebrich | 252—400 X |
| 3,194,823 | 7/1965 | Le Suer | 252—400 X |
| 3,297,584 | 1/1967 | Szczepanek et al. | 252—400 |
| 3,298,964 | 1/1967 | Szczepanek et al. | 252—400 |
| 3,317,436 | 5/1967 | Szczepanek et al. | 252—400 |

LEON D. ROSDOL, Primary Examiner

I. GLUCK, Assistant Examiner

U.S. Cl. X.R.

117—100, 167; 252—18; 260—23, 45